Patented Feb. 9, 1932

1,844,926

UNITED STATES PATENT OFFICE

WILLIAM TOMLINSON MacLEESTER, OF PHILADELPHIA, PENNSYLVANIA

MANUFACTURE OF MONO-METHYL-PARA-AMINOPHENOL SULPHATE

No Drawing.    Application filed August 17, 1922. Serial No. 582,558.

My invention is a process for the preparation of monomethyl-para-aminophenol by the decomposition of para-hydroxyphenylglycine in a suitable medium and for the conversion of such base into its sulphate while in said medium with the formation of monomethyl-para-aminophenol sulphate.

In the practice of my invention, decomposition of para-hydroxyphenylglycine is effected by heating in the presence of a medium which acts as a solvent therefor. Preferably the medium used is also a solvent for the resulting monomethyl-para-aminophenol base, which may be extracted from the solvent and simultaneously converted to the sulphate form by the addition of sulphuric acid. The mediums described herein and which I have successfully used have melting points below the normal melting point of para-hydroxyphenylglycine and are chemically inert relatively thereto. The heating is continued until the para-hydroxyphenylglycine is completely decomposed when the $CO_2$ resulting from the decomposition ceases to be given off.

The mediums which I have found preferable because of their actions as solvents of both the para-hydroxyphenylglycine and the monomethyl-para-aminophenol are compounds having an hydroxyl group linked to a carbon atom of a single benzene nucleus, such, for instance, as ortho, meta or para cresol, technical cresol (cresylic acid) or the like belonging to the same homologous series of higher phenolic compounds.

In the preferred practice of my invention, I heat the para-hydroxyphenylglycine with an excess (about ten times its weight) of cresylic acid at a temperature of from 165 to 170° C. at atmospheric pressure. The resulting solution of monomethyl-para-aminophenol is cooled to room temperature. The separation of the base from the cresylic acid is preferably effected by agitation with a dilute solution containing a quantity of sulphuric acid slightly in excess of that required for sulphating the base; the extraction of the base and its conversion to the sulphate form (without opportunity for oxidation) being thereby simultaneously effected. The aqueous solution is then separated from the cresylic acid and upon evaporation the monomethyl-para-aminophenol sulphate crystallizes in a comparatively pure condition. Further purification can, of course, be effected by recrystallization.

While the detailed example above given comprises the use of cresylic acid (technical cresol) it will be understood that this is for reasons of commercial economy. In other words, although ortho, meta or para cresol may be employed with good success, such compounds in their pure form are much more expensive than cresylic acid which works equally as well, which is available commercially at a reasonable price and which comprises a mixture of the cresols as well as other related phenolic bodies of the same homoiogous series. It will be understood, therefore, that the cresols are exemplary and not limiting of the higher phenolic bodies which may be employed in carrying out my invention, either in commercial (technical) form, embodying mixtures of such bodies or in purified form, it being necessary only that—as pointed out above—the phenolic medium be a solvent for and have a melting point lower than both the para-hydroxyphenylglycine and the monomethyl-para-aminophenol base and that it be chemically inert thereto.

Having described my invention, I claim:

1. The process of producing monomethyl-para-aminophenol which comprises decomposing para-hydroxyphenylglycine to monomethyl-para-aminophenol in the presence of a cresol.

2. The process of manufacturing monomethyl-para-aminophenol which comprises heating para-hydroxyphenylglycine in cresylic acid at a temperature of approximately 165°–170° C.

3. A process of the character described, which includes carrying out the decomposition of para-hydroxyphenylglycine to methylpara-minophenol (base), by means of heat, in a protecting medium comprising cresylic acid.

4. A process of the character described, which includes making a mixture of cresylic acid and para-hydroxyphenylglycine in which the cresylic acid predominates sufficiently to constitute a protective medium for the para-hydroxyphenylglycine during its decomposition by means of heat, and heating the mixture sufficiently to decompose the para-hydroxyphenylglycine to methylpara-aminophenol (base) without decomposing the cresylic acid.

5. The process of manufacturing monomethyl para-aminophenol which comprises heating para-hydroxyphenylglycine in cresylic acid at a temperature of about 170° C.

6. The process of manufacturing monomethyl para-aminophenol which comprises heating a mixture of para-hydroxyphenylglycine and cresylic acid, in the proportion of one part of para-hydroxyphenylglycine to ten parts of cresylic acid, sufficiently to decompose the para-hydroxyphenylglycine to monomethyl para-aminophenol without decomposing the cresylic acid.

7. The process of producing monomethyl-para-aminophenol sulphate which comprises decomposing para-hydroxyphenylglycine to monomethyl-para-aminophenol in the presence of a cresol and then agitating the reaction mixture with a solution containing a quantity of sulphuric acid sufficient to convert the monomethyl-para-aminophenol to monomethyl-para-aminophenol sulphate.

8. The process of producing monomethyl-para-aminophenol sulphate which comprises decomposing para-hydroxyphenylglycine to monomethyl-para-aminophenol in the presence of a cresol and then agitating the reaction mixture with a dilute aqueous solution containing a quantity of sulphuric acid sufficient to convert the monomethyl-para-aminophenol to monomethyl-para-aminophenol sulphate.

9. A process of the character described which includes making a mixture of a cresol and para-hydroxyphenylglycine, in which the cresol predominates sufficiently to constitute a protective medium for the para-hydroxyphenylglycine during its decomposition by means of heat, and heating the mixture sufficiently to decompose the para-hydroxyphenylglycine to methylpara-minophenol without decomposing the cresol.

In testimony whereof I affix my signature.

WILLIAM TOMLINSON MacLEESTER.